US009277728B2

(12) United States Patent
McDougal et al.

(10) Patent No.: US 9,277,728 B2
(45) Date of Patent: Mar. 8, 2016

(54) MILKING APPARATUS AND SYSTEM

(75) Inventors: Graeme David McDougal, Hamilton (NZ); Jamie Christopher Joseph Mikkelson, Hamilton (NZ); Rodrick Peter Staheli, Hamilton (NZ)

(73) Assignee: GEA Farm Technologies GmbH, Bönen (DE)

( * ) Notice: Subject to any disclaimer, the term of this patent is extended or adjusted under 35 U.S.C. 154(b) by 588 days.

(21) Appl. No.: 13/703,971

(22) PCT Filed: Jun. 14, 2011

(86) PCT No.: PCT/NZ2011/000105
§ 371 (c)(1),
(2), (4) Date: Dec. 13, 2012

(87) PCT Pub. No.: WO2012/005602
PCT Pub. Date: Jan. 12, 2012

(65) Prior Publication Data
US 2013/0087101 A1 Apr. 11, 2013

(30) Foreign Application Priority Data

Jun. 14, 2010 (NZ) ........................................ 586155
Mar. 30, 2011 (NZ) ........................................ 592007

(51) Int. Cl.
*A01J 5/013* (2006.01)
*A01J 7/00* (2006.01)
(Continued)

(52) U.S. Cl.
CPC .. *A01J 7/04* (2013.01); *A01J 5/007* (2013.01); *A01J 5/0131* (2013.01); *A01J 5/0134* (2013.01); *A01J 5/0135* (2013.01); *A01J 7/00* (2013.01); *A01K 1/12* (2013.01)

(58) Field of Classification Search
CPC ........... A01J 7/04; A01J 5/013; A01J 5/0135; A01J 5/00; A01J 5/007; A01J 5/0131; A01J 7/00
USPC .......................... 119/14.18, 14.02, 14.14, 670
See application file for complete search history.

(56) References Cited

U.S. PATENT DOCUMENTS 2,162,156 A 6/1939 Case
2,411,384 A 11/1946 Miller et al.
(Continued)

FOREIGN PATENT DOCUMENTS

AU 2007240190 12/2007
DE 19953700 5/2001
(Continued)

OTHER PUBLICATIONS

WO12/05602, Milfos International Limited, International Search Report dated Jul. 16, 2012, 7 pages.

*Primary Examiner* — Yvonne Abbott-Lewis
(74) *Attorney, Agent, or Firm* — Smith Law Office; Jeffry W. Smith

(57) ABSTRACT

A device suitable for attachment to a milking platform at a "milking position" has a strippings viewing area and a light source, which is operable to illuminate in a suitable manner the strippings viewing area to enhance the visibility to an operator of any mastitis symptoms in use and/or to illuminate the udder to facilitate inspection or treatment. The light source may also be operable to give continuous or intermittent color signals to the operator and the device might also include an alpha-numeric area. The device might form part of a leg separator and/or sprayer and/or milk hose support. A milking platform with such a device is also claimed.

28 Claims, 10 Drawing Sheets

(51) Int. Cl.
*A01J 7/04* (2006.01)
*A01J 5/007* (2006.01)
*A01K 1/12* (2006.01)

(56) References Cited

U.S. PATENT DOCUMENTS

| | | | |
|---|---|---|---|
| 2,460,101 A | | 1/1949 | McMurray |
| 2,467,949 A | | 4/1949 | Thomas |
| 2,518,831 A | | 8/1950 | Stalloch et al. |
| 2,582,432 A | | 1/1952 | Herring |
| 2,754,720 A | | 7/1956 | Johnson |
| 2,841,050 A | | 7/1958 | Kircher |
| 2,935,384 A | | 5/1960 | Schalm et al. |
| 3,554,166 A | | 1/1971 | Belden |
| 4,034,713 A | | 7/1977 | Umbaugh |
| 4,149,489 A | | 4/1979 | Umbaugh et al. |
| 4,156,179 A | * | 5/1979 | Stephen et al. ............ 324/442 |
| 4,225,820 A | | 9/1980 | Rysanek et al. |
| 5,743,209 A | * | 4/1998 | Bazin et al. ............ 119/14.08 |
| 6,493,071 B2 | * | 12/2002 | van den Berg et al. ........ 356/72 |
| 6,626,130 B1 | * | 9/2003 | Eriksson ................ 119/670 |
| 6,748,251 B2 | * | 6/2004 | Tsenkova et al. .......... 600/310 |
| 6,793,624 B2 | * | 9/2004 | Tsenkova ................ 600/309 |
| 7,234,414 B2 | * | 6/2007 | Claycomb et al. ........ 119/14.02 |
| 8,033,247 B2 | * | 10/2011 | Torgerson et al. ........ 119/14.47 |
| 8,261,597 B2 | | 9/2012 | Wiethoff |
| 8,590,486 B2 | * | 11/2013 | Torgerson et al. ........ 119/14.47 |
| 2002/0033138 A1 | | 3/2002 | Brayer |
| 2003/0136344 A1 | * | 7/2003 | Lincke ................ 119/14.47 |
| 2007/0289536 A1 | | 12/2007 | Dunn et al. |
| 2010/0242845 A1 | | 9/2010 | Pharaoh |

FOREIGN PATENT DOCUMENTS

| | | |
|---|---|---|
| DE | 102006051362 | 4/2008 |
| DE | 102007004539 | 7/2008 |
| EP | 0091892 | 10/1983 |
| EP | 0189954 | 8/1986 |
| EP | 0194729 | 9/1986 |
| EP | 0349019 | 1/1990 |
| EP | 1266565 | 12/2002 |
| GB | 497126 | 12/1938 |
| GB | 1176176 | 1/1970 |
| GB | 2029255 | 3/1980 |
| NZ | 586155 | 6/2010 |
| NZ | 592007 | 3/2011 |
| WO | WO96/13151 | 5/1996 |
| WO | WO00/22919 | 4/2000 |
| WO | WO00/74472 | 12/2000 |
| WO | WO02/102142 | 12/2002 |
| WO | WO03/104785 | 12/2003 |
| WO | WO2004/048968 | 6/2004 |
| WO | WO2007/146280 | 12/2007 |
| WO | WO2008/093344 | 8/2008 |
| WO | WO2008/104416 | 9/2008 |
| WO | WO2008/146276 | 12/2008 |
| WO | WO2009/113884 | 9/2009 |
| WO | WO2010/142301 | 12/2010 |
| WO | WO2012/005602 | 1/2012 |

* cited by examiner

MILKING APPARATUS AND SYSTEM

TECHNICAL FIELD

This invention relates to improvements in that part of a milking apparatus which is mostly at or adjacent the udder of a cow or other animals being milked. This invention can, in almost all aspects, be applied to herringbone or other stationary milking systems, while in all aspects it is additionally applicable to a rotary milking system, where the cows are milked while on a rotating turntable.

BACKGROUND ART

One of the processes in the milking operation is any treatment to be given to the cow's teats before or after application of the milking cups or cluster. Various spraying means have been used in the past for the purposes of pre-milking washing or spraying or post-milking spraying the teats and, perhaps, the udder. Some are as simple as a spray nozzle mounted into the platform floor or shed floor and able to be supplied via underfloor pipe work with a suitable washing or spraying fluid.

A more sophisticated device, used in New Zealand since about mid-1970 on a rotary platform had two spaced, in line with the cow's body, removable, screw-on spray nozzles, each provided with its own at a nozzle, in-line filter, the nozzles surmounting the ridge of a protruding, elongated, open-based, metal box of triangular cross section. The opposed sloping walls were designed to encourage the cow's legs apart to give good spray access to the teats and, perhaps, the udder and also to facilitate placing the cluster on the teats from between the hind legs with the milk hose exiting between the hind legs too.

The length of such a box-like arrangement was elongated in the direction of the length of the animal, which was substantially radial, and positioned under its udder with the nozzles fore and aft of the udder. Such a box was perimeter welded onto the steel floor and had closed ends, also sloping. Spraying fluid was supplied in a supply line under pressure from a fluid source external of the rotary turntable via a gland at the axis of rotation. Each bail was provided with a ball valve in a T branch off the fluid supply line most of which was accessible from the external pit area. The valve handles were spring-biased to the closed position. However, at a location just prior to the unloading position of the cow, the handle would come into contact with a stationary peg or similar to cause momentary opening of the ball valve thus enabling a post-milking disinfectant and perhaps emollient spray to be applied to all of the cow's teats and perhaps udder to constrain the incidence of mastitis and other ailments.

A development of that has been to mould the leg separator in plastics and such a device may be glued to the shed or platform floor, whether it be metal or concrete. Such a product is illustrated in New Zealand Registered Designs Nos. 411943, 411944, 411945 and 411946.

Mastitis checks of a milking herd are routinely required. While in its bail position and before an unloading position is reached, hand strippings of milk from each of the teats may be made with a view to examining them to see if there are any mastitis flecks, clumps, or blood, or if the milk is watery or abnormal in any way. Both sight and touch might be used. Many years ago black tiles used to be used on which to deposit the strippings for contrast and later that developed into a black plastic moulding of M cross-section (rather like two of the above-mentioned metal boxes joined longitudinally edge to edge but without nozzles) which also functioned as a leg separator. That device had no substantially horizontal surfaces when in use.

If a routine check is to be made on a milking herd then, perhaps immediately after the cups have been removed, following milking, while the platform is still on the move, single squirt hand strippings are viewed from a chosen quarter or quarters of each animal. At the same time, or as a separate check at that location, the state of each teat may be inspected, for example, to detect teat-end problems or to check redness (indicating a fault with the cluster or some other part of the milking apparatus or udder infection). These checks may be made in a dark environment as the general lighting, whether artificial or natural in a rotary milking shed mostly comes from overhead and little through any wall apertures or windows.

With modern electronic control of many of the operations to occur during a milking session, there has also been on some occasions provision of an individual eye-level bail screen which might for instance contain or display information about a particular animal as detected from the electronic ID collar or eartag which that animal might be wearing to alert the milking operator(s) to, perhaps, a health or production or other problem which that animal has, or may have, which will need to be checked or considered. The provision of such a screen is not operator-friendly as the eye-level information often goes unnoticed. The focus of the usual operator is to get the cow milked. As operator skill levels may be declining, in general, clear instructions, readily seen, are needed as to what actions they should be taking.

The improvements to be described hereafter were initially conceived with the aim of achieving many different objectives in a single base product—preferably a leg separator—able to be supplied to a customer in various optional forms, depending on the degree of sophistication required. However, the solutions achieved have advantages in other than such a single base product, as will be apparent from the following description.

DISCLOSURE OF THE INVENTION

The invention in its broadest aspect is:

A device suitable for installation on or in a milking platform at a "milking position" in use said device having a housing having at least a partly-open interior characterised in that said device also has one of the following features:

(a) a light source whose beam is directed upwardly to illuminate an udder in use,
(b) the housing being shaped to function as a leg separator combined with a milk contrasting surface which is substantially horizontal and drained in use
(c) the housing being shaped to have a recessed trough strippings viewing area which is substantially horizontal and drained in use
(d) the housing being shaped to provide a milk hose guide
(e) (d) plus the milk hose guide is an elongated channel in the housing
(f) a hose support is provided co-actable with the housing
(g) (f) plus the hose support is not readily removable from the housing by an animal to be, or being milked in use
(h) (f) or (g) plus the hose support is for both the milk and pulsation hoses, whether separate or integrally formed
(i) (f) or (g) plus the hose support is for the milk hose or integral milk hose alone (j) (f), (g), (h) or (i) plus the hose support readily plugs substantially vertically in use into or onto the housing and is readily, mechanically extractable upwardly and to a side of the housing (k) (f), (g), (h), (i) or (j) plus the hose support is flexible in the direction of the milk hose (l) (f), (g), (h), (i), (j) or (k) plus the hose support is operator slidable, against frictional resistance, lengthwise along the milk hose in use (m) (l) plus the provision of two hose supports each of a different colour and each giving different and optional hose support heights (n) (a) or any other construction including (a) plus the housing includes a switch to activate (a)

(o) (n) plus the switch is able to vary the beam intensity of (a)

(p) (n) or (o) plus the switch is able to vary the beam spread of (a)

(q) the housing being shaped to function as a leg separator combined with (a), (r) (q) combined with (n), (o) or (p)

(s) the housing having an alpha numeric display positioned at or adjacent the rear of the "milking position"

(t) the housing having an alpha numeric display positioned to be readable from the side of the "milking position"

(u) (c) plus in or adjacent the trough there is an alpha numeric display (v) (c) or (u) plus an illuminable panel forming the floor of the trough (w) (c) or (u) plus there is an additional LCD or similar screen display forming the floor of the trough (x) (b) plus (c) plus the housing having an alpha numeric display positioned at or adjacent the trough (y) (x) plus the alpha numeric display forms part of the floor of the trough and there is an illuminable panel which also forms part of the floor (z) (y) combined with (a)

(aa) (a) combined with (b)

(ab) (aa) combined with (c)

(ac) (ab) combined with (u)

(ad) (ac) combined with (y)

(ae) (a) combined with (b) combined with two lateral spray nozzles in the housing adapted to spray the teats of an udder from below and to each side of it in use (af) (ae) combined with an upwardly directed substantially central spraying nozzle in the housing adapted in use to enable the teats of an udder to be sprayed from a fore position below the udder in use (ag) (ae) or (af) combined with lateral spray nozzles which in use impart a swirling or rotary or spiralling motion to an ejected spray each in an opposite rotary direction (ah) all other possible combinations of elements in the specification which have been indicated as being novel, or which are novel, or which are novel combinations, or which are unique and have been described or illustrated herein.

In another aspect the invention consists in a milking platform provided on the platform surface at one or more "milking positions" with a device as set forth above or below.

In another aspect the invention consists in a device suitable for installation on or in a milking platform at a "milking position" in use, said device having (1) a strippings viewing area which when installed and in use is substantially horizontal, (2) a drainage path from said strippings viewing area, and (3) a light source which when activated in use shines its beam upwardly.

In another aspect the invention is a method of programming a bail control box on a rotary milking platform comprising the steps of programming a master controller by any suitable means and communicating the programme or desired parts thereof in the master controller to each bail control box by infrared or wireless communication as each bail control box is rotated past the master controller.

In one aspect a milking platform is provided on the platform surface at one or more "milking positions" with a device characterised in having a strippings viewing area and also having an upwardly directed light source.

In another aspect the invention consists in a leg separator provided with a detachable milk hose support.

In yet another aspect the present invention consists of a leg separator characterised in having a drainable, substantially horizontal, strippings viewing area.

BRIEF DESCRIPTION OF THE DRAWINGS

FIG. 1 shows a perspective view of a base product in the preferred form of a moulded plastics leg separator. This preferred form of a base product is able to be supplied in various optional forms of which FIG. 1 shows the simplest.

MODES FOR CARRYING OUT THE INVENTION

Definition of "Milking Position"

"Milking Position" in this specification and the claims means an area below the location of the udder of an animal ready to be, or being, or having been, milked.

Definition of "Translucent"

"Translucent" in this specification and the claims means a medium which transmits rays of light so diffused that lit objects cannot be distinctly seen through it.

In a preferred form the base product, namely a leg separator, is approximately 550 mm long by 280 mm long by 60 mm high, moulded in black plastics, and it optionally carries one or more spraying nozzles with the aim that there would be one such separator per milking position, fixed to the milking platform or deck in any suitable way. Fluid supply for any nozzles would come from pipework under the platform or deck and with the use of one or more solenoid valves would be controlled by suitable electrical signals. For example, our rotary milking system, which we sell, makes extensive use of infra-red transmitters and receivers to effect timed operations and spraying through the nozzles could be actuated by signals from such devices.

Figure 1:
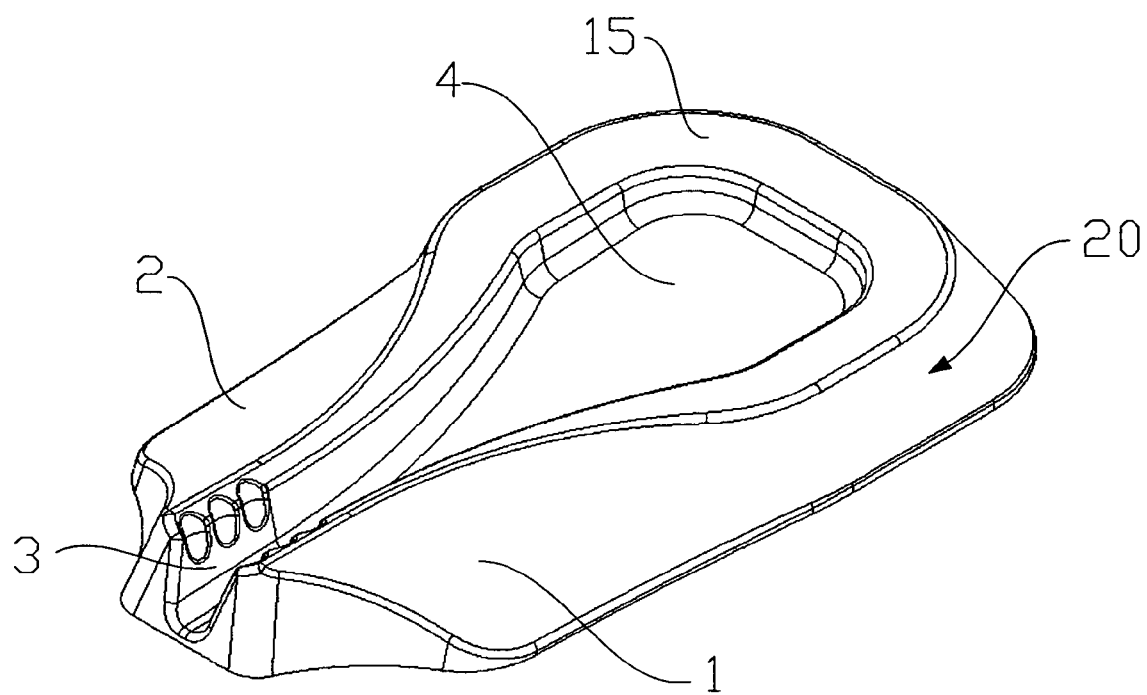

FIG. 1 shows a perspective view of a preferred form of the base product 20 where the base product 20 is adapted to be glued (and thus may be limited as to re-use in an upgrade) to a platform or deck as a leg separator, the sloping panels 1 and 2 encouraging that function while drainage channel 3 may also act as, and/or co-act with, a milk hose guide and support such as 14 (FIG. 5), to assist with relieving some of the weight of the cluster and drag of the milk and perhaps pulsation hoses, on the animal. This is novel. The area of the recessed trough 4 and its surrounding ledge 15 are for milk strippings (a process of extracting milk from each teat via hand milking) which can be viewed to check whether mastitis or milk abnormalities are present. As can be seen from FIG. 1 the trough and ledge are easily washed out by the usual directed, fixed, spray on a rotary platform just after the unloading position. The ledge 15 is substantially horizontal in use but with a sufficient slope towards the trough 4 to give drainage and the trough 4 and channel 3 likewise slope towards the end of channel 3 for drainage.

Figure 2:
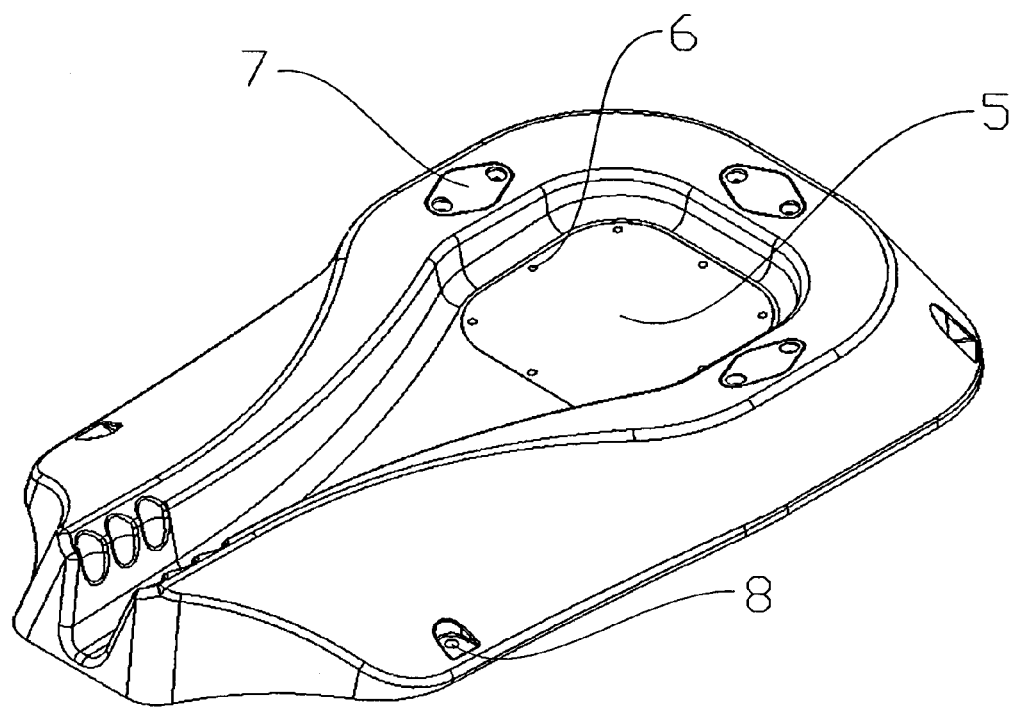
FIG. 2 shows an optional development of the version shown in FIG. 1 where the unit is adapted to be fastened directly to a milking platform or to a sub-base (not shown) enabling the leg separator to be readily detached to give access to its underside. As well, provision is made for removable blanking areas.

FIG. 2 shows improvements or upgrades where an illuminable translucent or clear panel 5 surmounts a suitable light source (such as an appropriate LED or LEDs) (or 5 is a colour contrasting panel) to allow better examination of milk strippings. As can be seen the panel 5 may be secured by suitable fastening means such as threaded fasteners 6 over appropriate sealing means (not shown) so that the panel 5 can be removed to give access to the or any light source. The electrical feed is supplied from under the platform or deck and the electrical components are protected from wetting. Plates such as 7 are blanking plates which may be either secured with threaded fasteners or integral fastening means which perhaps might be sacrificial or plates 7 can be knockouts. The blanking plates 7 may be removed at some subsequent stage to enable an optional fitting to be installed. Another option is to have the base 20 readily removable from the platform deck, or perhaps a glued-on sub-body (not shown), or for the base to be hinged to the deck for access purposes. Thus in a concrete deck suitable female-threaded stainless steel inserts may be located in drilled holes mating with holes such as 8 in the body which can be fastened to the inserts by stainless steel bolts or screws (not shown). Where the underside of the base 20 is accessible by one of these or other means the securement and sealing of panel 5 might also be from below.

Figure 3:
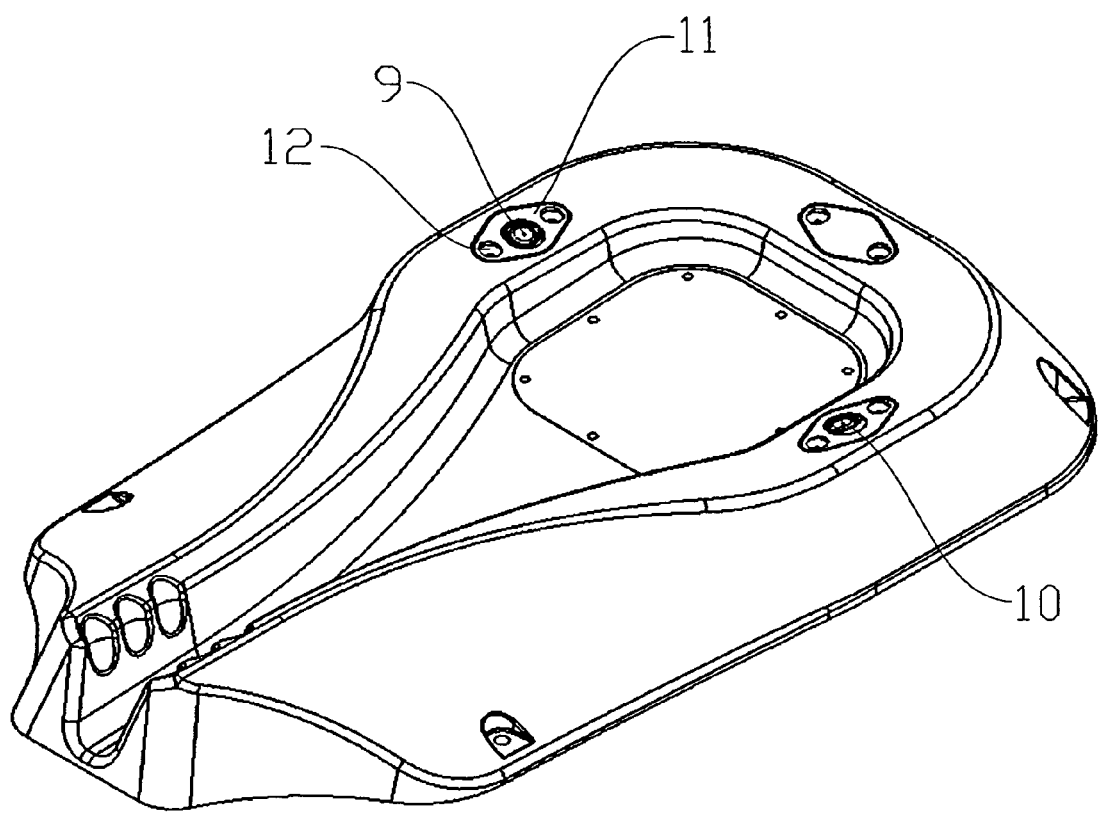
FIG. 3 shows an enhanced version with two lateral spraying nozzles provided to enable spraying of the teats and perhaps the udder of an animal.

FIG. 3 shows an improvement where nozzles 9 and 10 are fitted into opposing locations on opposite sides of the device. Each nozzle has a part-spherical body designed to fit into a part-spherical cup and to be held in that cup in a fixed position by means of a part-spherical clamping plate 11 secured into the main moulding by suitable threaded fasteners such as 12 so that the nozzle outlet can be aligned in a chosen direction within the permissible range available. The inlet to the nozzle is either through moulded inlet passages in the base 20 mating with a suitable aperture passing through the spherical part of the nozzle to the jetting portion or via a tail or other suitable coupling means provided on or in the part-spherical body portion enabling the connection of flexible piping to the liquid supply. Once the preferred alignment of the nozzles has been achieved the fasteners 12 are tightened down to hold the nozzle in place with the preferred alignment. A spiral or rotary motion (in opposite directions) imparted to the spray can assist teat coverage.

Figure 4:
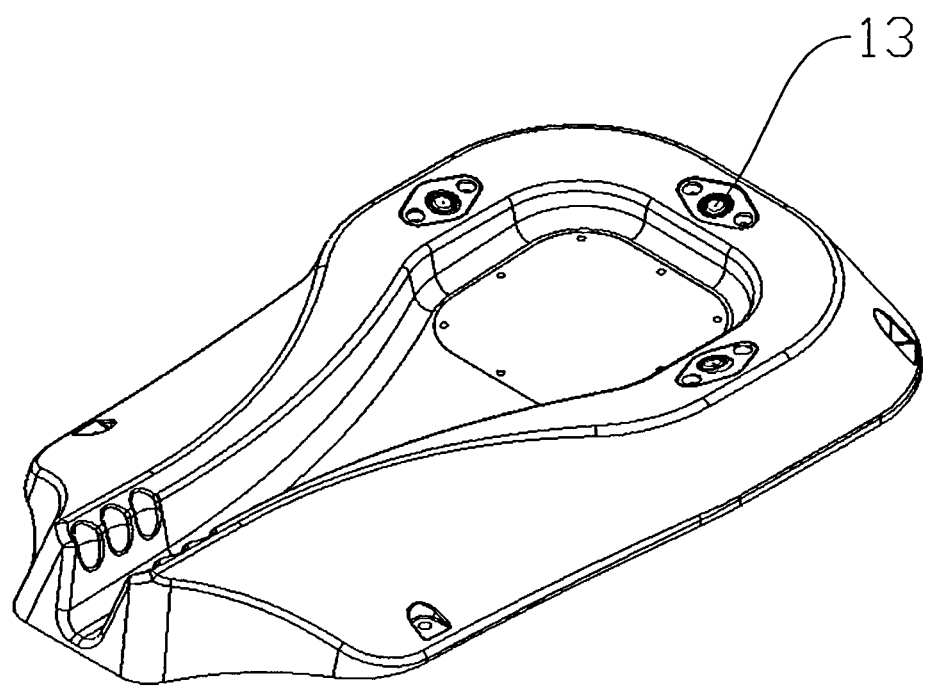
FIG. 4 shows an enhanced version where a further central, or head, spraying nozzle is provided to enable washing or spraying with either the same fluid as would be applied with the lateral nozzles or with an entirely different fluid and, perhaps, at a different rate and timing.

FIG. 4 shows a further improvement where a third nozzle 13 is provided in the form of a central or head nozzle, perhaps useable for a pre-milking spray, which could be connected to a different source of liquid supply and be operable with its own timing as to start and duration. There might also be a liquid-proof actuation button or switch (not shown) preferably recessed on, but optionally near, the base 20 enabling manual actuation of either of the spray lines via an electrical signal to a respective solenoid whenever an operator in the pit area chose.

Figure 5:
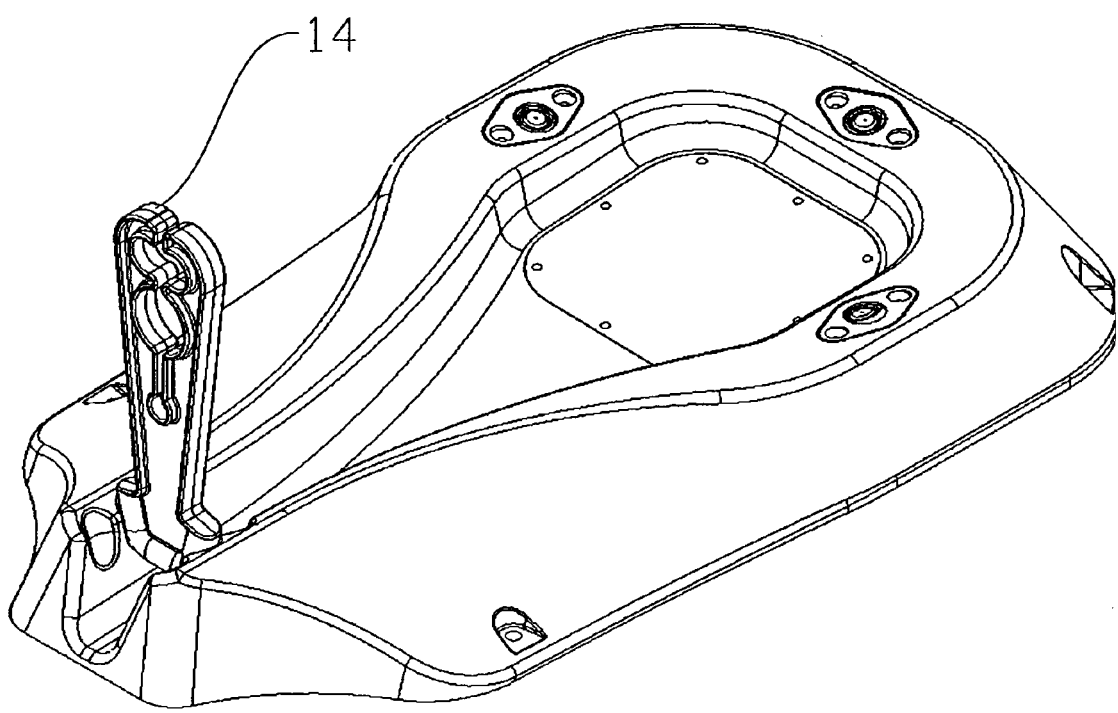
FIG. 5 shows an enhanced version where a support is provided for holding the milk, and if preferred, each pulsation hose, tube or line.

FIG. 5 shows an improvement to the base 20 with a clip-in hose support 14 for the pulsation and milk hoses, tubes, or lines.

Figure 6:
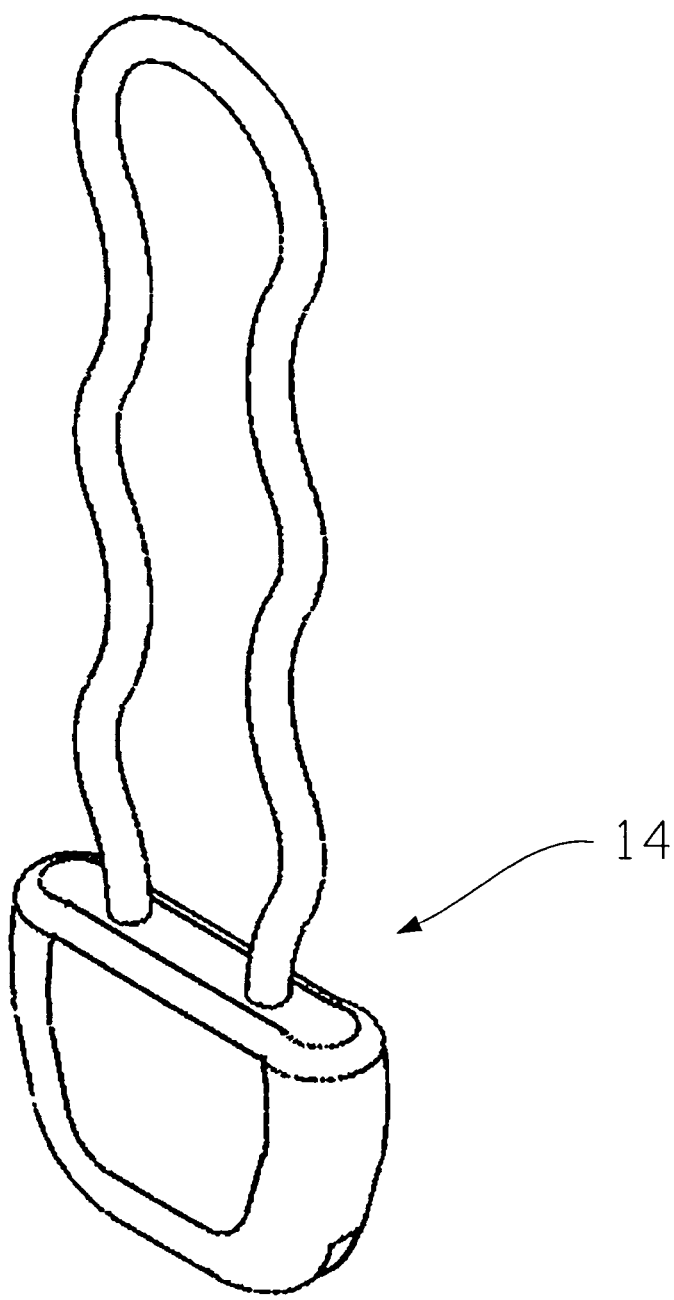
FIG. 6 shows a perspective view of an alternative support to that of FIG. 5 for a milking hose alone.

FIG. 6 shows an alternative support 14 designed to hold just the milk hose.

Figure 9:
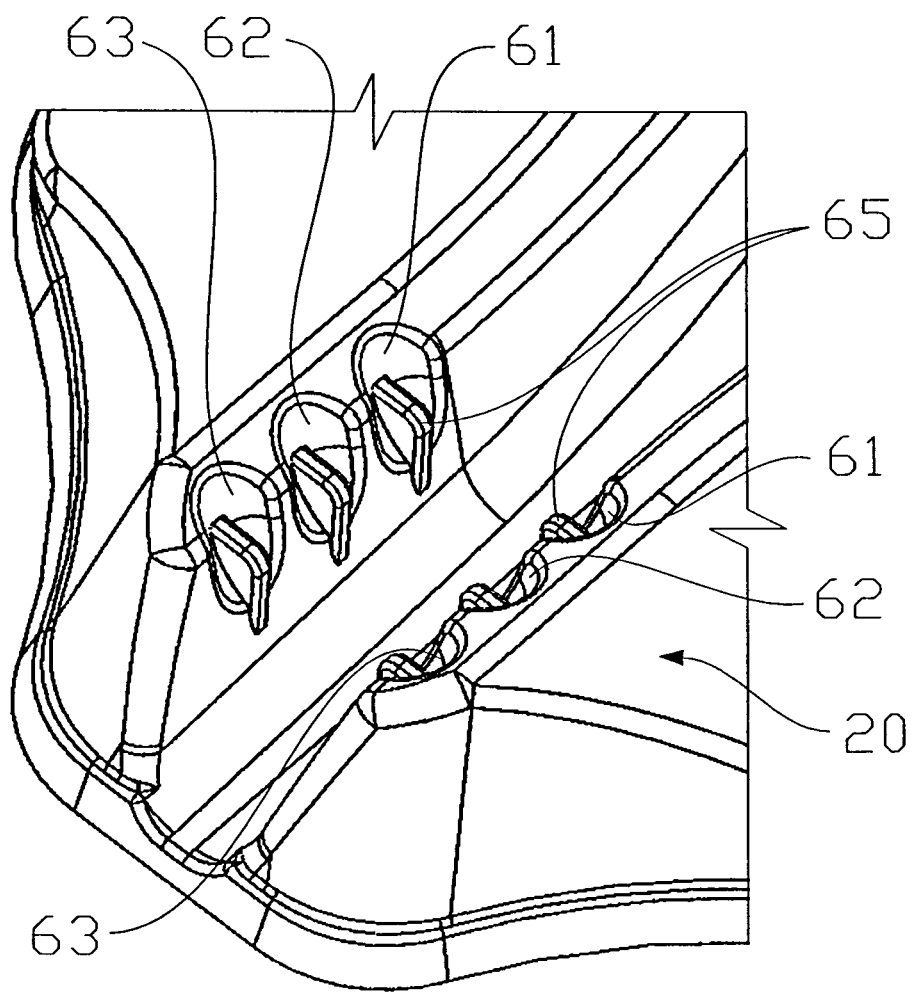
FIG. 9 shows possible detail, not shown in FIGS. 1-5 and 7, of part of the leg separator and is to be viewed in conjunction with FIG. 10.
Figure 10:
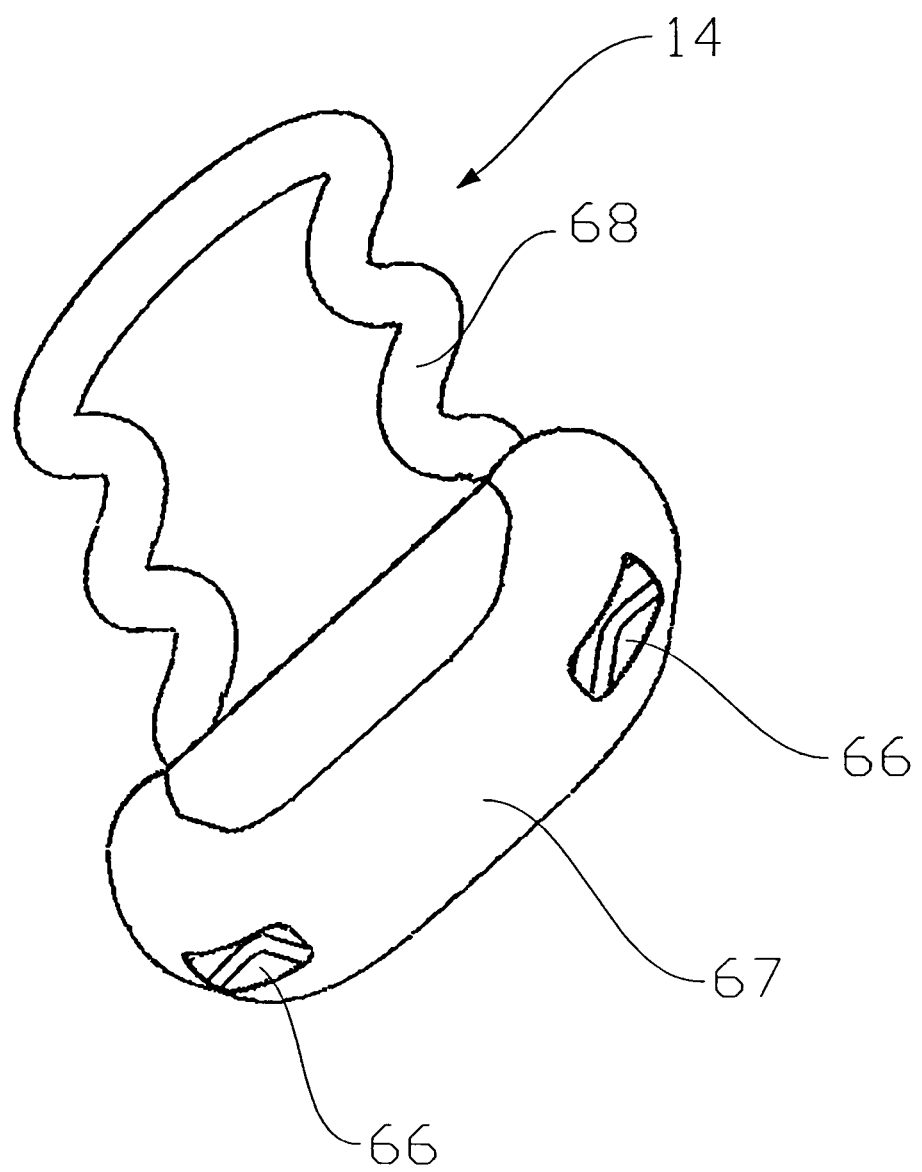
FIG. 10 shows an underneath view of the support of FIG. 6 and the means by which the support co-acts with the leg separator as shown in FIG. 9.

FIGS. 9 and 10 show detail of the mating between support 14 and the base 20. The grip of support 14 should be sufficient so that a cow cannot shake the support 14 out of the base 20 but also should be simply provided so that the operator can insert the support quickly when applying the cluster. The grip must also be free enough for support 14 to be removed from the base 20 with automated removal of the cluster which will exert a sideways and upwards pull on the support 14. Other mating solutions are self-evident.

There are several slots such as 61, 62 and 63 in the base 20 to give the operator some choice as where best to locate the support 14 in the base 20 (see FIG. 9). For a low udder, support 14 might be left loose and the milk tube aligned in the channel 3 (FIG. 1). In each of those slots 61-63 there is an upstand such as 65. The upstands are designed to be an appropriate fit within slots 66 provided at the base end 67 of the support (see FIG. 10). As can be seen from FIG. 10, the milk hose is able to be suitably constrained within a hairpin shaped wire or moulding 68 which has a degree of springiness associated with it in the direction of the milk hose and which also has an appropriate amount of frictional fit to the milk hose to allow it to be appropriately operator-positioned along the length of the milk hose, when required. That position might require adjustment for each individual animal and such adjustment must be able to be effected quickly by an operator. One option is to have a choice of supports 14 of different heights for each milk hose so that the operator can select neither, or the one of the most appropriate height, (perhaps coloured differently) to give the most appropriate alignment.

From the above description it will be appreciated that a product is provided which can be made in one basic shape as a leg separator capable of having certain areas blanked off in the die during moulding or by blanking plates or knockouts to form the simplest rendition but being of a suitable size and shape to enable varying degrees of sophistication to be achieved, depending on the end-application.

Any spray nozzles provided are able to be provided accessible for service or replacement quite readily and the whole device may preferably be secured in a releasable manner, rather than glued, to its platform support or a glued-on or cast-in sub-body (not shown).

An external control device would be provided for each bail which could use a combination of electrical and infra-red signals to activate the various functions to be achieved by the above described device. Preferably there is an independent electronic controller that interrogates a combination of signals from the electronic cluster remover combined with feedback from strategically positioned infra-red transmitters to signal either the start point or the end point of milking and to activate a solenoid or solenoids to apply teat-spray and/or solution to the udder before and/or after milking. However the product can be configured to work with almost any type of electronic or pneumatic cluster removal.

One of the features of one form of the leg separator product was the provision of a panel 5 on which milk strippings could be accumulated to facilitate a visual mastitis or milk abnormality check and that plate might optionally have been provided with suitable lighting beneath it, in a case where the plate was clear or translucent, to facilitate such an observation.

Figure 7:
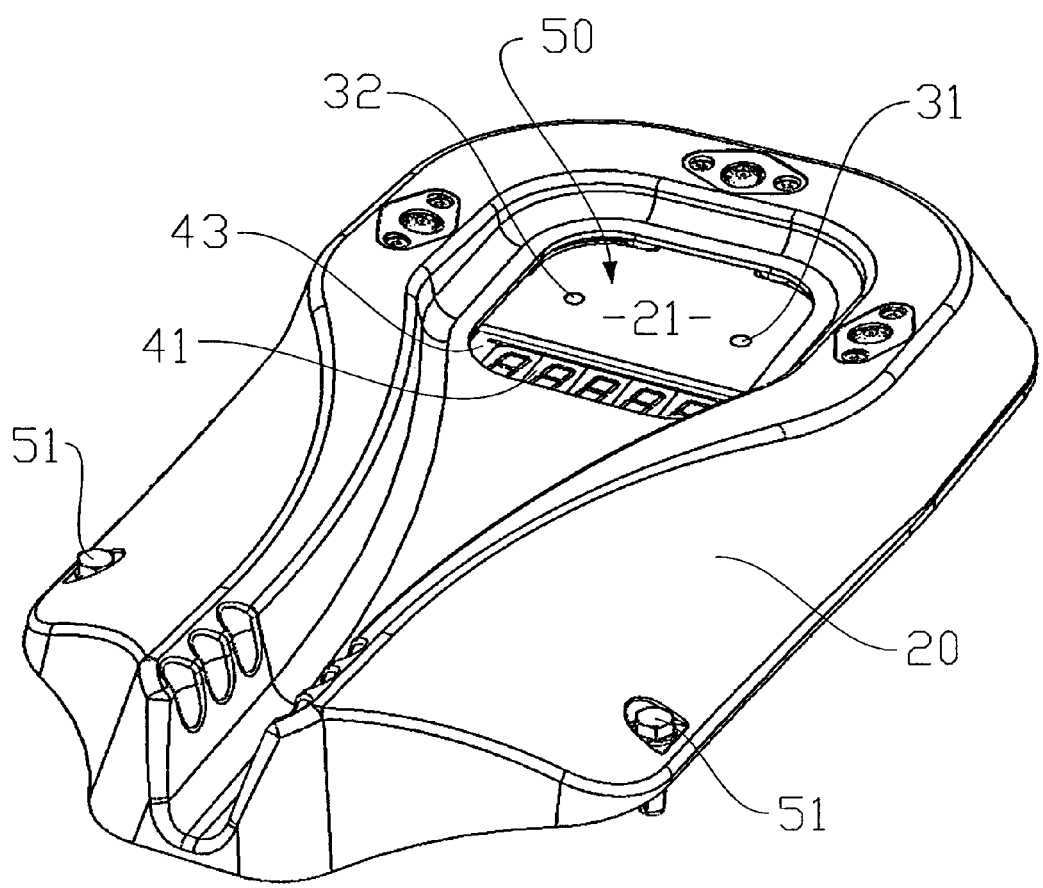
FIG. 7 shows an upgrade from the leg separator to include a multi-functional illuminable panel and udder illumination.
Figure 8:
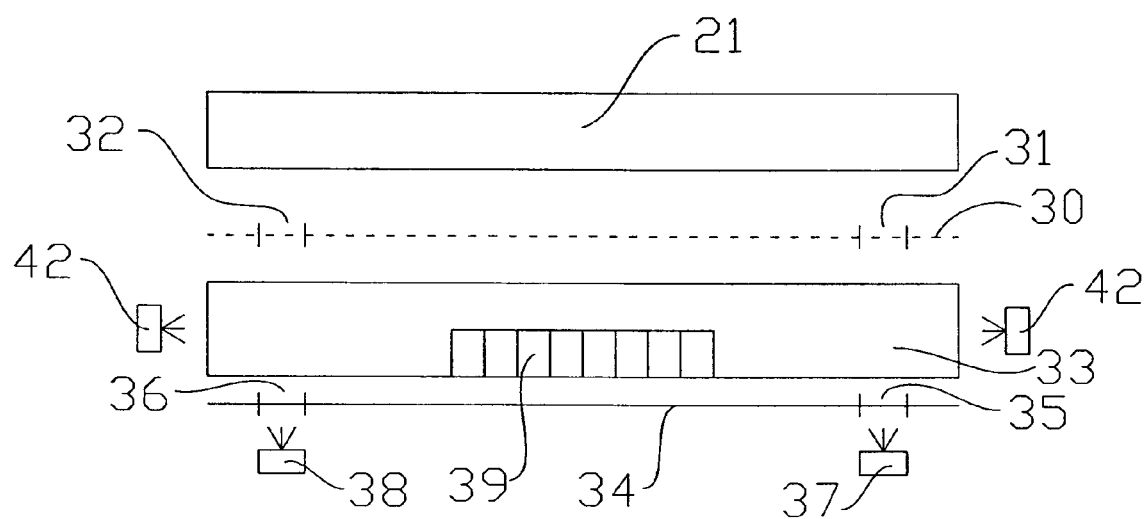
FIG. 8 shows a schematic end view of some of the components which may make up the panel and illumination of FIG. 7.

A further improvement of the present invention will be described with reference to FIG. 7 and FIG. 8. In FIG. 7 the area that was formerly wholly occupied by the panel 5 is instead provided with a display area shown generally at 50. A clear or translucent display and/or lighting panel or plate 21 is shown perhaps secured to the body of the leg separating device 20 by means of threaded fastenings (not shown) around the perimeter as per FIG. 2. However, an alternative is to secure the panel or plate 21 from its underside by means of threaded fastenings or alternatives, as it is envisaged that if access to any components underneath the plate 21 are required, then the whole unit 20 will be removed by detaching the fastenings such as 51 holding it to the surface on which it is designed to be mounted.

In what follows 21 is a plate made of clear material for, example possibly from scratchproof glass, polycarbonate, nylon 12 or TR90 or a polysulfone or some other suitable material. Underneath the plate 21 is a diffuser 30 (FIG. 8) having a small circular hole 31 at one side and an equivalent hole 32 at the other side. Underneath that is a clear acrylic block 33 and below that, and possibly in contact with it, is a reflective sheet or layer 34. Sheet 34 is also provided with holes 35 and 36 directly below holes 31 and 32 respectively and below holes 35 and 36 are high intensity white light-emitting diodes (LEDs) 37 and 38 or another form of suitable, perhaps spot-light or coloured, illumination. LEDs 37 and 38 are intended to be used to illuminate the udder of the animal when they are activated. A bank of white or full spectrum RGB light-emitting diodes 39 is positioned adjacent the location 41 of a possible 16 digit alphanumeric display. With the assistance of the diffuser 30 suitable light from the LED bank 39 which is reflected upwardly from the reflector 34 can provide an even illumination under plate 21 thus creating a strong contrast between mastitis flecks and normal milk components. If any udder illumination does not have to pass through the plate 21 then the diffuser 30 might be eliminated and plate 21 might be made of translucent material with lighting from below or the side.

The provision of the LED bank 39 or other light source without the high intensity LEDs 37 and 38 or their substitute is part of one possible route to upgrade from a mere leg separator as shown generally at FIG. 1. An earlier or later upgrade step could be provision of high intensity LEDs 37 and 38 or a substitute light source in any location on the base product 20. A next upgrade step may be provision of an encircling band of LEDs 42 or another light source wrapping around the perimeter of plate 33 (apart, perhaps, from any section occupied by LED bank 39).

The encircling band and perhaps the LED band 39 would preferably be RGB LEDs able to be controlled to give a multitude of colours and light intensities.

A further final or intermediate upgrade might be the provision of a 16 digit alphanumeric display board under a clear portion of a clear plate 21 at location 41. The area 43 surrounding 41 would be blanked off from light sources such as 37, 38, 39 and 42.

In a herringbone rotary platform the cluster will be placed on from, and removed from, the side of the cow as the bail positions are not substantially radial. The udder illumination and display panel and milk hose guide might be located in a base product at or adjacent the "milking position" which has no leg separation function and perhaps no optional spraying function. Spraying can be achieved by on-platform nozzles not associated with any leg separator or by intermittent mechanically thrust-into-position spray wands or booms or simply manually by an operator using a wand. The essence would be to have a base product orientation convenient for the operator.

In the simplest upgrade from the leg separator 20 of FIG. 1 the LED bank 39 might be the only light source provided. In such a case the 230 volt mains power supply would be stepped down to perhaps 12 or 24 volts and all of the LED banks 39 of a number of leg separators would be daisy-chained together in parallel so that the panels 5 or 21 would all be illuminated during the whole, or a suitable part, of a milking session.

Otherwise, overhead of each bail, in a dry area, there would be a control box containing componentry to enable more sophisticated operation of the lighting and digital display areas. Thus for example the LED bank 39 need not be illuminated until the cluster has been removed (also controlled from circuitry within that box as might be the colour and/or pulsing of the encircling LEDs 42). The high intensity LEDs 37 and 38 might be activated at the time the cluster was being attached to the udder for instance and they need not necessarily be located where shown in FIG. 8 but could be provided instead of, or in a similar manner to, nozzles.

Because of the variety of ways in which the features of the leg separator, with pre-milking and post-milking sprays and various lighting effects and signals, can be operated, the precise programme for the control box might need to be changed to suit the particular milking location or a particular programme to be effected. The control box componentry is able to be programmed by receiving suitable infrared, or wired, or wireless signals. Rather than having to programme each control box individually for a rotary platform a master controller is setup at a single point and is programmed as required and is then instructed to transmit that programme to each of the control boxes as they pass by. This may be done during a milking session where a variation from the beginning programme sequence has been found desirable. This is a novel method.

The under-lighting from LEDs 37 and 38 is chosen to be sufficiently strong, when activated, to illuminate the teat area of a cow or other animal to be milked, so that, for instance, the operator can see that the teats are sufficiently clean before the cups are attached or for other inspection purposes. As mentioned a separate spotlight or lights for the purpose can be provided in some other part of the body 20 where a convenient blankable insertion location (not shown) could be moulded into the product.

Preferably, when viewed, the surface, or part of the surface, or several parts of the surface of the plate 21 are adapted to convey information visually to the operator. For example, light source 42 beneath the plate 21 may be caused to pulsate to draw the attention of the operator to something the operator needs to do or observe. If high intensity white illumination from LEDs 37 and 38, or similar, is provided than the pulsing of that to indicate a fault can be very advantageous as the light will reflect off metal components, and walls, and the animal, to enable the location of the fault to be readily discerned by an operator some distance away.

For example, an animal identified by means of its collar or eartag identity or some other identification means could be read by a suitable reader as having entered the bail. The light source could pulsate to indicate that that animal required specific attention.

Where an alphanumeric display is provided each segment could be activated to show a desired indicia such as a letter or number to get information to an operator. For example, three segments could be illuminated to show the letters "SBY" short for "Standby" just prior to platform rotation commencing.

The visual display may be the result of a program operating during at least part of a milking session. For example, the program might require the identification of each bail containing an animal which had previously been observed to have a certain condition needing checking.

It is also envisaged that the clear panel or plate 21 might even be as sophisticated as being protectively covering wholly or in part a robust LCD or similar display screen equivalent to that used with a computer, and thus capable of being programmed to enable any chosen amount or type information to be displayed.

It is also possible to have the plate 21 overlying or able to be illuminated from below by several light sources of different colours e.g. there might be four quarters in one particular area, each quarter being able to be lit up sequentially perhaps by, for example, high powered LED lamps, one being white, another green, another amber and another red for instance.

By the use of suitably coloured under-lighting panel 21 may at times entirely show perhaps one or four different colours when lit. Those colours can be white, green, amber and red, for instance, and might be controllable to give pulses or strobes of several different frequencies.

The provision of system information and/or animal illumination in the area indicated generally at 50 is novel. The operator, instead of having to look up at a screen to see what is happening or whether there are any alerts or any particular information relating to the specific animal or location, instead has a "heads-down" display.

The heads-down display improves productivity and feedback to operators as the display is right in front of the operator and displays the most up-to-date information.

| Ref | Description |
| --- | --- |
| 1 | Sloping panel |
| 2 | Sloping panel |
| 3 | Channel |
| 4 | Recessed trough |
| 5 | Clear or translucent panel |
| 6 | Threaded fasteners for 5 |
| 7 | Blanking plates |
| 8 | Fastening holes in 20 |
| 9 | Lateral nozzle |
| 10 | Lateral nozzle |
| 11 | Nozzle clamping plate |
| 12 | Nozzle threaded fastener |
| 13 | Head nozzle |
| 14 | Hose support |
| 15 | Ledge |
| 16 | |
| 17 | |
| 18 | |
| 19 | |
| 20 | Base product - leg separator |

-continued

| Ref | Description |
| --- | --- |
| 21 | Clear or translucent panel or plate |
| 22 | |
| 23 | |
| 24 | |
| 25 | |
| 26 | |
| 27 | |
| 28 | |
| 30 | Diffuser |
| 31 | Diffuser hole |
| 32 | Diffuser hole |
| 33 | Clear block |
| 34 | Reflective sheet |
| 35 | Hole in 34 |
| 36 | Hole in 34 |
| 37 | LED - high intensity |
| 38 | LED - high intensity |
| 39 | LED bank |
| 40 | |
| 41 | Alpha numeric display |
| 42 | Encircling band of LEDs |
| 43 | Blanked off area |
| 44 | |
| 50 | Display area |
| 51 | Platform or base fastener - through 8 |
| 61 | Slot in 20 |
| 62 | Slot in 20 |
| 63 | Slot in 20 |
| 64 | |
| 65 | Upstand in 61, 62 or 63 |
| 66 | Slot in 14 |
| 67 | Base end of 14 |
| 68 | Hairpin head of 14 |

The invention claimed is:

1. A milking platform device disposed at a milking position in a diary, the device comprising:
   a housing having at least a partly-open interior,
   a milk contrasting surface, and a drain; and
   a milk hose guide joined to the housing.

2. The device of claim 1, and further comprising: an upwardly directed light joined to the housing.

3. The device of claim 1, and further comprising: a light joined to the housing and directed to illuminate the milk contrasting surface.

4. The device of claim 1, and further comprising: an upwardly directed light directed to illuminate a dairy animal udder when the dairy animal is at the milking position.

5. The device of claim 1, and further comprising: a light controlled to flash on and off.

6. The device of claim 1, and further comprising: an alpha numeric visual display panel joined to the housing.

7. The device of claim 1, wherein the milk hose guide is a channel defined by the housing.

8. The device of claim 1, wherein the milk hose guide includes a hose support joined to the housing to support a milk hose and a pulsation hose.

9. The device of claim 1, wherein the milk hose guide includes a hose support joined to the housing to support a milk hose.

10. The device of claim 1, wherein the milk hose guide includes a substantially vertical hose support releasably attached to the housing.

11. The device of claim 1, wherein the milk hose guide includes a hose support that is flexible in a direction that is substantially aligned with a milk hose direction.

12. The device of claim 1, wherein the milk hose guide includes a hose support frictionally secured to the housing.

13. The device of claim 1, and further comprising: a first hose support and a second hose support having a height that is different than a first hose support height.

14. The device of claim 1, wherein the housing is shaped as a leg separator.

15. The device of claim 1, and further comprising an alpha numeric display joined to the housing.

16. The device of claim 1, and further comprising: an illuminable panel forming a floor of the housing interior.

17. The device of claim 1, and further comprising: a screen display forming at least a portion of the housing interior.

18. The device of claim 1, and further comprising: a plurality of spray nozzles joined to the housing adapted to spray teats of an udder of a dairy animal standing at the milking position.

19. The device of claim 1, and further comprising: an upwardly directed substantially central spraying nozzle joined to the housing.

20. A device for installation on a milking platform at a milking position, the device comprising:
    a housing having:
        a strippings viewing area;
        a drain from the strippings viewing area; and
        a light for illuminating the strippings viewing area.

21. The device of claim 20 wherein, the strippings viewing area is translucent and the light is disposed below the strippings viewing area.

22. A device for installation on a milking platform at a milking position, the device comprising:
    a strippings viewing area;
    a drain from the strippings viewing area; and
    a light; wherein the strippings viewing area is translucent and the light illuminates the strippings viewing area.

23. The device of claim 22, wherein the strippings viewing area includes a translucent plate and the light illuminates the strippings viewing area.

24. The device of claim 22, wherein the light comprises: a plurality of light-emitting diodes at least one of which is substantially white and at least one of which is substantially some color other than white.

25. The device of claim 22, wherein the device further comprises: an alpha numerical information display panel.

26. The device of claim 22, wherein at least part of the device is a dairy animal leg separator.

27. The device of claim 22, and further comprising: a teat sprayer.

28. The device of claim 22, and further comprising: a milk hose support.

* * * * *